(12) United States Patent
Seo et al.

(10) Patent No.: US 10,459,738 B2
(45) Date of Patent: Oct. 29, 2019

(54) ELECTRONIC APPARATUS FOR CONTROLLING A POWER STATE OF AN EXTERNAL APPARATUS AND METHOD THEREOF

(71) Applicant: SAMSUNG ELECTRONICS CO., LTD., Suwon-si (KR)

(72) Inventors: Je-hwan Seo, Daegu (KR); Jong-jin Park, Suwon-si (KR); Seung-il Yoon, Yongin-si (KR); Min-sup Kim, Suwon-si (KR); Hyun-kyu Yun, Seoul (KR); Kyung-ik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 15/820,900

(22) Filed: Nov. 22, 2017

(65) Prior Publication Data
US 2018/0143838 A1    May 24, 2018

(30) Foreign Application Priority Data
Nov. 22, 2016   (KR) ........................ 10-2016-0155391

(51) Int. Cl.
*G06F 1/26*    (2006.01)
*G06F 9/44*    (2018.01)
(Continued)

(52) U.S. Cl.
CPC .............. *G06F 9/442* (2013.01); *G06F 1/263* (2013.01); *G08C 17/02* (2013.01);
(Continued)

(58) Field of Classification Search
None
See application file for complete search history.

(56) References Cited

U.S. PATENT DOCUMENTS

| 8,935,433 B1 | 1/2015 | Hironaka |
| 2005/0162282 A1 | 7/2005 | Dresti et al. |

(Continued)

FOREIGN PATENT DOCUMENTS

| JP | 2007184824 A | 7/2007 |
| KR | 1020020009016 A | 2/2002 |

(Continued)

OTHER PUBLICATIONS

International Search Report (PCT/ISA/210), issued by International Searching Authority in corresponding International Application No. PCT/KR2017/013044, dated Mar. 13, 2018.

(Continued)

*Primary Examiner* — Danny Chan
(74) *Attorney, Agent, or Firm* — Sughrue Mion, PLLC

(57) ABSTRACT

An electronic apparatus and a power controlling method thereof are provided. The electronic apparatus may include a wireless communicator that communicates with a remote controller, a wired communicator that connects with an external input device and a processor that controls the wireless communicator to transmit a control signal to the remote controller for turning off power of the connected external input device in response to receiving a signal from the remote controller for turning off power of the electronic apparatus.

18 Claims, 8 Drawing Sheets

(51) Int. Cl.
    *G06F 9/4401* (2018.01)
    *G08C 17/02* (2006.01)
(52) U.S. Cl.
    CPC ..... *G08C 2201/12* (2013.01); *G08C 2201/50* (2013.01); *G08C 2201/51* (2013.01)

(56) References Cited

U.S. PATENT DOCUMENTS

| | | | |
|---|---|---|---|
| 2006/0109384 A1 | 5/2006 | Miller-Smith et al. | |
| 2011/0211131 A1* | 9/2011 | Kikuchi | G06F 1/3218 348/734 |
| 2011/0242415 A1 | 10/2011 | Wakabayashi | |
| 2013/0318265 A1* | 11/2013 | Lee | G06F 13/42 710/106 |
| 2013/0322846 A1* | 12/2013 | Ferren | G06K 9/3266 386/234 |
| 2014/0253817 A1* | 9/2014 | Burns | H04N 5/44 348/734 |

FOREIGN PATENT DOCUMENTS

| | | |
|---|---|---|
| KR | 10-2006-0131455 A | 12/2006 |
| KR | 1020080036721 A | 4/2008 |
| KR | 100861994 B1 | 10/2008 |
| KR | 1020100022295 A | 3/2010 |
| KR | 10-2013-0040538 A | 4/2013 |
| KR | 10-1489811 B1 | 2/2015 |
| KR | 10-1586153 B1 | 1/2016 |
| KR | 10-2016-0016410 A | 2/2016 |

OTHER PUBLICATIONS

Written Opinion (PCT/ISA/237) issued by the International Searching Authority in corresponding International Application No. PCT/KR2017/013044, dated Mar. 13, 2018.

Communication dated Mar. 28, 2018, from the European Patent Office in counterpart European Application No. 17202138.8.

* cited by examiner

ELECTRONIC APPARATUS FOR CONTROLLING A POWER STATE OF AN EXTERNAL APPARATUS AND METHOD THEREOF

CROSS-REFERENCE TO RELATED APPLICATION

This application claims priority from Korean Patent Application No. 10-2016-0155391, filed in the Korean Intellectual Property Office on Nov. 22, 2016, the disclosure of which is incorporated herein by reference in its entirety.

BACKGROUND

1. Field

Apparatuses and methods consistent with example embodiments relate to an electronic apparatus and a power controlling method thereof, and more particularly, to an electronic apparatus that controls a power state of an external apparatus to be consistent with a power state of an electronic apparatus through monitoring of a power state, and a power controlling method thereof.

2. Description of Related Art

Electronic apparatuses can be connected with various types of external input devices and receive image data from the external devices. As more apparatuses and devices are used, a need for integral control over a plurality of apparatuses and devices has increased.

For example, the integral power control and a source conversion have been performed using a function such as an HDMI-CEC (High-Definition Multimedia Interface-Consumer Electronics Control). However, it is not compulsory to apply the HDMI-CEC function, and even if the HDMI-CEC function is applied in a product, the manufacturing company can choose whether to use the product with a basic setting.

However, when turning off the power of an electronic apparatus, there has been a problem in controlling the power of an external input device to also be turned off. Further, there has been the problem that there is no solution for an error occurred in integral power control which uses the HDMI-CEC function.

SUMMARY

According to an aspect of an example embodiment, an electronic apparatus is provided, the electronic apparatus including a wireless communicator configured to communicate with a remote controller; a wired communicator configured to connect with an external input device; and a processor configured to: control the wireless communicator to transmit a control signal to the remote controller for turning off power of the connected external input device in response to receiving a signal from the remote controller for turning off power of the electronic apparatus.

The processor may be further configured to: determine a power state of the external input device in response to receiving the signal for turning off power of the electronic apparatus from the remote controller, and control the wireless communicator to transmit the control signal to the remote controller in response to the determined power state of the external input device being inconsistent with a power state of the electronic apparatus.

The processor may be further configured to, after transmitting the control signal to the remote controller, determine a power state of the external input device, and control the wireless communicator to re-transmit the control signal until the determined power state of the external input device is consistent with the power state of the electronic apparatus.

The electronic apparatus may further include a detection circuit configured to detect a clock signal of a signal input through the wired communicator connected with the external input device, wherein the processor may be further configured to determine the power state of the external input device using the clock signal detected in the detection circuit.

The wired communicator may be an HDMI interface, and wherein the clock signal may be a clock signal of an HDMI signal.

The processor may be further configured to control the wireless communicator to transmit information about the connected external input device to the remote controller with the control signal.

The information about the external input device may include at least one from among device information of the external input device and source information input from the external input device.

The wireless communicator may be further configured to provide a unidirectional communication method when receiving a signal from the remote controller, and provide a bidirectional communication method when transmitting a signal to the remote controller.

The unidirectional communication method may be an infrared (IR) method, and the bidirectional communication method may be one from among Bluetooth and Bluetooth Low Energy.

According to an aspect of an example embodiment, there is provided a power controlling method of an electronic apparatus, the method including: receiving a signal from a remote controller for turning off power of the electronic apparatus; and in response to receiving the signal for turning off the power of the electronic apparatus, transmitting a control signal to the remote controller for turning off power of an external input device connected with the electronic apparatus.

The method may include determining a power state of the external input device in response to receiving the signal for turning off power of the electronic apparatus, wherein the transmitting the control signal to the remote controller may include transmitting the control signal to the remote controller in response to the determined power state of the external input device being inconsistent with a power state of the electronic apparatus.

The method may include determining a power state of the external input device after transmitting the control signal to the remote controller; and re-transmitting the control signal until the determined power state of the external input device is consistent with the power state of the electronic apparatus.

The method may include detecting a clock signal of a signal input from the external input device, wherein the determining the power state of the external input device may include determining the power state of the external input device using the detected clock signal.

The external input device may be connected with the electronic apparatus through an HDMI interface, and wherein the clock signal that is input from the external input device may be a clock signal of an HDMI signal.

The method may include transmitting information about the connected external input device to the remote controller with the control signal.

The information about the external input device may include at least one from among device information of the external input device and source information input from the external input device.

The electronic apparatus may provide a unidirectional communication method when receiving a signal from the remote controller, and may provide a bidirectional communication method when transmitting a signal to the remote controller.

The unidirectional communication method may be an infrared (IR) method, and the bidirectional communication method may be one from among Bluetooth and Bluetooth Low Energy.

According to an aspect of an example embodiment, there is provided an electronic apparatus including: a processor configured to: in response to receiving a signal from a remote controller for turning off power of the electronic apparatus, control a wireless communicator to transmit a control signal to the remote controller for turning off power of an external input device, which is connected to the electronic apparatus; and after transmitting the control signal to the remote controller, determine a power state of the external input device, and control the wireless communicator to re-transmit the control signal until the determined power state of the external input device is consistent with the power state of the electronic apparatus.

The processor may include a main processor and a sub-processor, wherein the main processor may be configured to enter a suspend mode in which power is not supplied to the main processor in response to the electronic apparatus receiving the signal from the remote controller for turning off the electronic apparatus, and wherein the sub-processor may be configured to maintain power supplied to the sub-processor in response to the electronic apparatus receiving the signal from the remote control for turning off the electronic apparatus.

The sub-processor may be further configured to transmit a control signal to the remote controller for turning off the power of the connected external input device.

DETAILED DESCRIPTION

Example embodiments relate to an electronic apparatus which can monitor the power state of a connected external input device and control the power state of an electronic apparatus to be consistent with the power state of the external input device using an integral remote controller as a bypass, and a power controlling method thereof.

According to the various example embodiments, the reliability of an integral power control function may be secured.

Below, various example embodiments will be described in greater detail with reference to the accompanying drawings. For reference, when it is deemed that the detailed description of the known function or configuration may obscure the gist of the embodiments in describing them, the detailed description thereof will be omitted. The terms below are terms defined in consideration of the functions in the present disclosure, and may thus vary depending on the user, operation and practice, and so on.

The terms including ordinal number such as "first," "second," and so on may be used in the description and the claims to distinguish the elements from one another. These terms are used only for the purpose of differentiating one component from another, without limitation thereto. For example, without departing from the scope as described herein, a first element may be referred to as a second element, or similarly, a second element may be referred to as a first element. The term "and/or" includes a combination of a plurality of described relevant items or any item of a plurality of described relevant items.

The terms used in this description are provided to explain the example embodiments, and not for restricting and/or limiting the present disclosure. A singular term includes a plural form unless otherwise indicated. The terms, "include," "comprise," "is configured to," etc. of the description are used to indicate the existence of features, numbers, steps, operations, elements, parts or combination thereof, and do not exclude the possibilities of combination or addition of one or more features, numbers, steps, operations, elements, parts or combination thereof.

In an example embodiment, 'a module' or 'a unit' performs at least one function or operation, and may be embodied as hardware, software, or a combination thereof. Further, except "modules" or "units" that should be implemented by certain hardware, a plurality of "modules" or a plurality of "units" may be integrated into at least one module and embodied as at least one processor.

Below, example embodiments will be described in detail with reference to the accompanying drawings.

Figure 1:
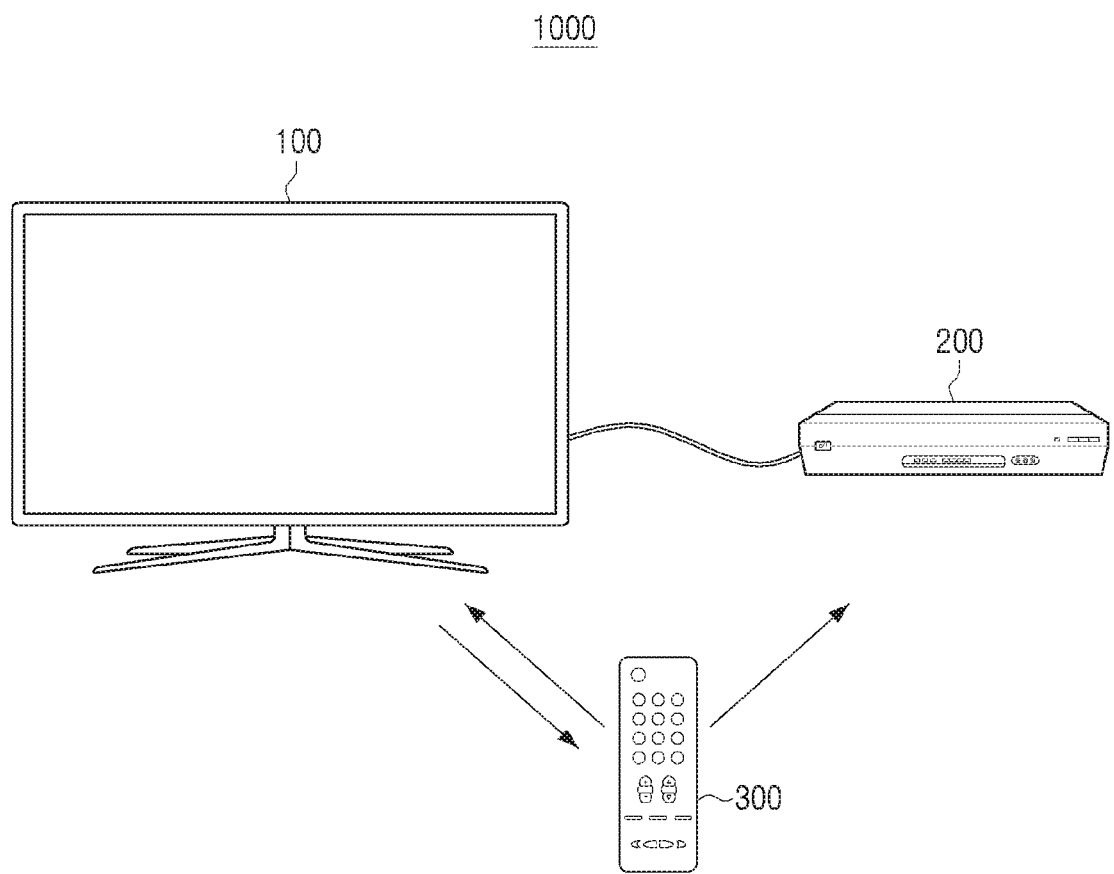
FIG. 1 is a concept view illustrating a system, according to an example embodiment.

FIG. 1 is a concept view illustrating a system 1000 according to an example embodiment. As illustrated in FIG. 1, the system 1000 may include an electronic apparatus 100, an external input apparatus 200 and a remote controller 300. The electronic apparatus 100 may be connected with the external input device 200 via cable. Also, the electronic apparatus 100 may transmit and receive the external input device 200, data, a control signal, etc. through the wired connection.

The electronic apparatus 100 may be a TV as illustrated in FIG. 1, but example embodiments are not limited thereto. For example, the electronic apparatus 100 may be implemented as a monitor, a laptop, a kiosk, a tablet, an electronic frame, etc., which include a display, or may be implemented as an image processing device with no display.

The external input apparatus 200 may perform a function of receiving an image signal, etc., from an external source and relay the signal to the electronic apparatus 100. For example, the external input device 200 may be implemented as a set-top box, a gaming device, a multimedia device, etc. The external input device 200 may be connected with the electronic apparatus 100 through a wired interface such as an HDMI cable, component cables, etc.

The remote controller 300 may control the electronic apparatus 100, but the remote controller 300 may also control the external input device 200 using an integral remote controller function (e.g., a multi brand remote function). For example, the remote controller 300 may receive a control code for controlling the external input device 200 from the electronic apparatus 100. It is illustrated that the remote controller 300 is implemented as a smart remote controller, but example embodiments are not limited thereto. The remote controller 300 may be implemented as various devices such as a pointing device, a motion recognition device, a voice recognition device, a multimedia device, a universal remote controller, a gaming controller, a mobile smartphone, etc.

According to an example embodiment, to turn off power of the electronic apparatus 100 does not necessarily mean that the power supplied to all the functional units is stopped. For example, the electronic apparatus 100 may be converted into a suspend mode or a power saving mode and stop supplying power to the components such as a main processor (e.g., a CPU) and a display. However, the electronic apparatus 100 may maintain the power supplied to a sub processor (e.g., MICOM), a user command input unit, and so on. Thus, the electronic apparatus 100 may perform an operation such as monitoring the power state of the external input device 200, etc., after receiving a control signal for turning off the power of the electronic apparatus 100. The electronic apparatus 100 may also convert the power state thereof to a turned-off state after determining that the power of the external input device 200 is turned off.

For example, the electronic apparatus 100 may support a 'suspend to RAM power off' (SRPO) state when the power is turned off, and the electronic apparatus 100 may transmit a memory wake-up address and the system power off state, which are required in subsequent booting, to a sub processor (e.g., MICOM) before entering the SRPO state, and store them. The memory wake-up address may be a kernel wake-up vector value of an operating system, which should be firstly performed after resuming, among memory addresses which memorize a prior operation state of a system. The electronic apparatus 100 may perform a high-speed booting sequence in the subsequent turning-on process using the stored information. Accordingly, when a power-on signal is received from the remote controller 300, the electronic apparatus 100 may instantly display an image signal using the stored memory wake-up address.

For example, the remote controller 300 may transmit to the electronic apparatus 100 a control signal for turning off both the power of the electronic apparatus 100 and of the external input device 200. In this case, the electronic apparatus 100 may convert the state thereof to a suspend mode, and simultaneously, transmit a power-off control signal to the external input device 200 through a wired interface.

As another example, the remote controller 300 may transmit a control signal for turning off power to both the electronic apparatus 100 and the external input device 200.

In the two examples above, the electronic apparatus 100 may determine the power state of the external input device 200. If it is determined that the power of the external input device 200 is not turned off, the electronic apparatus 100 may transmit to the remote controller 300 a signal requesting that the remote controller 300 transmit a power-off control signal to the external input device 200.

In other words, the power state of the electronic apparatus 100 and the power state of the external input device 200 may match with each other using the remote controller 300 as a medium. A user may simply press a power-off button of the remote controller 300, and the remote controller 300 may intermediate the operation of controlling the power states to be consistent with each other without the knowledge of the user. Thus, the function of the remote controller 300 may be referred to as a hidden integral remote controller function (e.g., a hidden master boot record (MBR)).

The description of the operation of the system 1000 above is an example embodiment, and example embodiments are not limited thereto. Below, various example embodiments related to the operations of the electronic apparatus 100 will be described.

Figure 2:
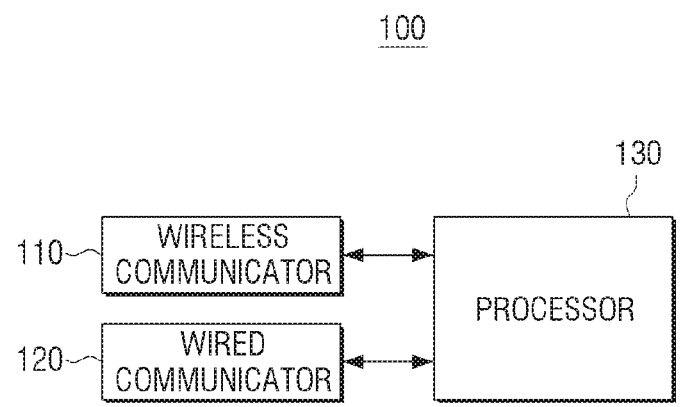
FIG. 2 is a block diagram illustrating a configuration of an electronic apparatus, according to an example embodiment.

FIG. 2 is a block diagram illustrating a configuration of the electronic apparatus 100 briefly according to an example embodiment. Referring to FIG. 2, the electronic apparatus 100 may include a wireless communicator 110, a wired communicator 120 and a processor 130.

The wireless communicator 110 may communicate with the remote controller 300. For example, the wireless communicator 110 may receive from the remote controller 300 a control signal transmitted by a unidirectional communication method. Also, the wireless communicator 110 may transmit a control signal to the remote controller 300 by a bidirectional communication method.

The wired communicator 120 may connect the electronic apparatus 100 with the external input device 200. The electronic apparatus 100 may analyze the signal transmitted from the external input device 200 via the wired communicator 120 and determine the power state of the external input device 200.

The processor 130 may control overall operations of the electronic apparatus 100. For example, when the signal for turning off the power of the electronic apparatus 100 is received from the remote controller 300, the processor 130 may control the wireless communicator 110 to transmit to the remote controller 300 the control signal for turning off the power of the connected external input device 200. The remote controller 300 may transmit the signal for turning off power to the external input device 200 in response to the received control signal.

The processor 130 may determine the power state of the connected external input device 200. The method for determining a power state will be described later.

For example, when a signal for turning off the power of the electronic apparatus 100 is received from the remote controller 300, the processor 130 may determine the power state of the connected external input device 200. If the power state of the external input device 200 is not consistent with the power state of the electronic apparatus 100 (i.e., if the power state of the external input device 200 is in a turned-on state), the processor 130 may control the wireless communicator 110 to transmit the control signal for turning off the power of the connected external input device 200 to the remote controller 300.

As another example, when the signal for turning off the power of the electronic apparatus 100 is received, the processor 130 may control the wireless communicator 110 to transmit to the remote controller 300 the control signal for turning off the power of the connected external input device 200 before determining the power state of the external input device 200. Then, the processor 130 may determine the power state of the external input device 200, and re-transmit the control signal continuously until the power state of the electronic apparatus 100 is consistent with the power state of the external input device 200.

As another example, the processor 130 may determine the power state of the external input device 200 at regular time intervals.

Figure 3:
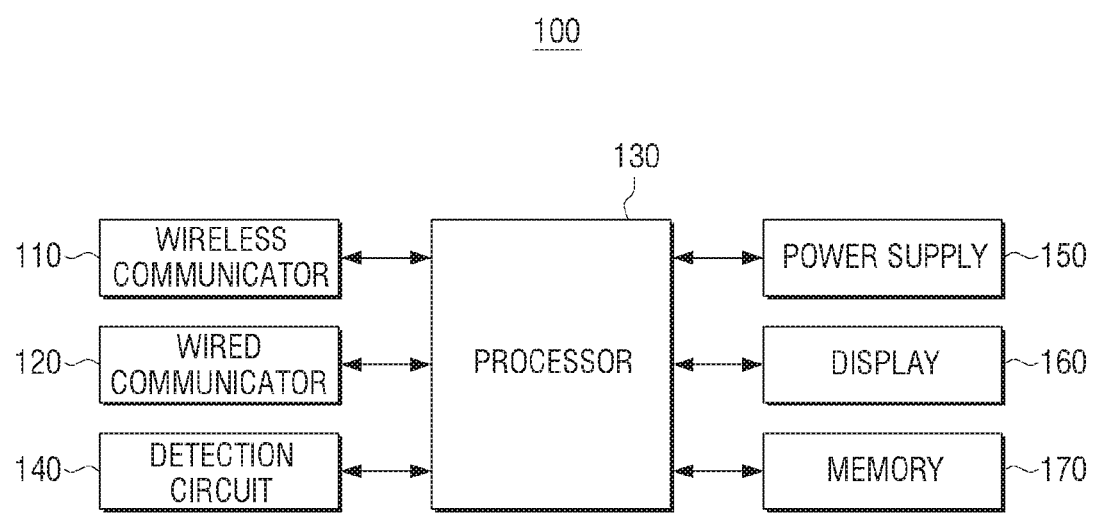
FIG. 3 is a block diagram illustrating a configuration of an electronic apparatus in detail, according to an example embodiment.

FIG. 3 is a block diagram illustrating a configuration of the electronic apparatus 100 according to an example embodiment. Referring to FIG. 3, the electronic apparatus 100 may include the wireless communicator 110, the wired communicator 120, the processor 130, a detection circuit 140, a power supply 150, a display 160 and a memory 170. However, the components of the electronic apparatus 100 are not limited to the elements illustrated in FIG. 3, and the electronic apparatus 100 may be implemented as including the element such as an image processor, etc., and may also be implemented without an element such as the display 160.

The wireless communicator 110 may communicate with an external device by various wireless communication methods. The wireless communicator 110 may transmit data, a control signal, etc. to the remote controller 300 by a bidirectional communication method. For example, the wireless communicator 110 may transmit to the remote controller 300, not only a control signal for changing the power state of the external input device 200, but also the information on the external input device 200. The information on the external input device 200 may include at least one from among device information and source information, and the remote controller 300 may identify the external input device 200 using the received device information or source information and determine a control code set for controlling the external input device 200.

The wireless communicator 110 may include various communication chips which support bidirectional communication. For example, the wireless communicator 110 may include a chip which operates by Bluetooth (BT), Bluetooth Low Energy (BLE), near field communication (NFC), and/or Wi-Fi. In the case of connecting by BT, various connection information such as an SSID, a session key, etc. may be firstly transmitted to and received from the remote controller 300, and once the connection is completed, the information including a control command may be transmitted.

The wireless communicator 110 may receive a control signal from the remote controller 300 by a unidirectional communication method. For example, the wireless communicator 110 may receive a control signal by an InfraRed (IR) communication method. For the IR communication, an IR receiver may be arranged outside the electronic apparatus 100.

The wired communicator 120 may connect the electronic apparatus 100 with the external input device 200. The wired communicator 120 may use a high definition multimedia interface (HDMI), a low voltage differential signaling (LVDS), a local area network (LAN), or the like as the wired communication method.

In a case in which the wired communicator 120 is connected with the external input device 200 through an HDMI, which is one of the standards of a digital video/audio interface based on a non-compression method, there may be an advantage that it is possible to use the standard method for exchanging an attribute between a source and a sink, the method which is supported by the HDMI.

For example, the wired communicator 120 may transmit a control signal using a consumer electronics control (CEC) line among the signal lines of the HDMI. One of the 19 pins on the end of the HDMI may be assigned to the CEC. In a case in which the HDMI-CEC function is set to be used in both the electronic apparatus 100 and the external input device 200, the control signal for turning off the power of the external input device 200 may be transmitted to the external input device 200 through the wired communicator 120.

As another example, the electronic apparatus 100 may analyze a clock signal of the HDMI and monitor the power state of the external input device 200 connected through the HDMI. The corresponding example embodiment will be described in detail later.

As another example, in a case in which the electronic apparatus 100 is paired with the external input device 200 through the HDMI, the information related to the external input device 200 may be recorded in an Extended Display Identification Data (EDID), and the information may be provided through a Display Data Channel (DDC). Accordingly, the wired communicator 120 may receive the information of the physical connection state of the external input device 200 and of the electronic apparatus 100 and the attribute information of the external input device 200.

The LVDS is a signal standard based on which image data is transmitted from an image device to a computer monitor, and the LVDS is used in an flat panel display link (FPD link) of a flat panel or in an opened LVDS display interface (OpenLDI) standard. When communication is performed through the wired connection using the LVDS method, the wired communicator 120 may identify the physical connection state of the wired LVDS of the external input device 200 by using a signal. Also, the wired communicator 120 may newly define the reserved or undefined data part of the signal and use the defined part to exchange attribute information.

Also in the case of using the LVDS, the processor 130 may determine the power state of the external input device 200 by monitoring whether a clock signal or another image signal is transmitted. In the description below, a wired communicator 120 is implemented as an HDMI.

The detection circuit 140 may detect a clock signal in the signal input through the wired communicator 120 connected with the external input device 200. The detection circuit 140 may include a switch 141 (S/W), which switches an image signal received through the wired communicator 120, and a clock detector 143 which determines whether a clock signal is present in a received image signal. For example, the switch 141 may be implemented as a TTL (Transistor-transistor logic) or a differential signal circuit.

According to an example embodiment of the detection circuit 140 above, it is described that only whether a clock signal is present is detected, but the detection circuit 140 may determine not only whether a clock signal is present but also whether RGB data, an H sync signal and a V sync signal are present.

The power supply 150 may supply power to each of the components of the electronic apparatus 100. For example, the power supply 150 may be implemented as a switched-mode power supply (SMPS). The SMPS refers to a power supply including a switching regulator. As the SMPS can further reduce the size and the weight of a transformer compared to a power supply, the SMPS may be used in an internal circuit of the electronic apparatus 100.

When a power-off signal is received, the power supply 150 may stop supplying power to some of the components of the electronic apparatus 100. For example, the power supply 150 may stop supplying power to the main processor 131 and the display 160. Also, even after a power-off signal is received and the power mode of the electronic apparatus 100 is changed to a suspend mode, the power supply 150 may maintain the power supplied to the wireless communicator 110 so that the monitoring of the power state of the external input device 200 may be performed.

The display 160 may display a variety of image content, information, a user interface (UI), etc., which are provided from the electronic apparatus 100. For example, the display 160 may display a user interface window in which image content provided from the external input device 200 and image content to be reproduced can be selected. For example, a user interface window may include a guide message, an alarm message, a function setting menu, a calibration setting menu, an operation performing button, or the like.

The display 160 may be implemented in various forms such as a liquid crystal display (LCD), an organic light emitting diodes (OLED), an active-matrix organic light-emitting diode (AM-OLED), a plasma display panel (PDP), or the like.

The memory 170 may store various programs and data which are required for operating of the electronic apparatus 100. The memory 170 may be implemented as a flash memory, a hard disk, etc. For example, the memory 170 may include a ROM for storing a program for performing the operations of the electronic apparatus 100 and a RAM for temporarily storing data in relation to performing of the operations of the display apparatus 100. The memory 170 may also include an electrically erasable and programmable ROM (EEPROM) for storing a variety of reference data. For example, even if the electronic apparatus 100 receives a power-off signal and is converted into a suspend mode, the power supplied to the RAM which is a volatile memory may be maintained.

An image receiver 180 may receive image content data through various sources. For example, the image receiver may receive broadcast data from an external broadcasting station. As another example, the image receiver may receive image data from the external input device 200 or receive image data from a server by streaming.

An image processor may perform an image-processing of the image data received from the image receiver. The image processor may perform the image-processing such as decoding, scaling, noise filtering, frame rate conversion and resolution conversion for the image data.

An audio output unit (e.g., audio output interface) may output not only various audio data processed in an audio processing module but also various alarm sounds or a voice message.

The processor 130 may control the components of the electronic apparatus 100 described above. For example, the processor 130 may monitor the power state of the external input device 200 connected through the wired communicator 120, and determine whether to control the wired communicator 110 to transmit a control signal to the remote controller 300 according to the result of the monitoring.

The operation of monitoring the power state of the external input device 200 by the processor 130 will be described below with reference to FIG. 4.

The electronic apparatus 100 may be connected with the external input device 200 through the wired communicator 120, and the external input device 200 may transmit an image signal, etc. to the electronic apparatus 100 through the wired communicator 120. For example, the wired communicator 120 may be the interface which is based on the HDMI standard. The switch 141 may switch a clock signal of an image signal input through the wired communicator 120 and transmit the clock signal to the clock detection unit 143.

Figure 4:
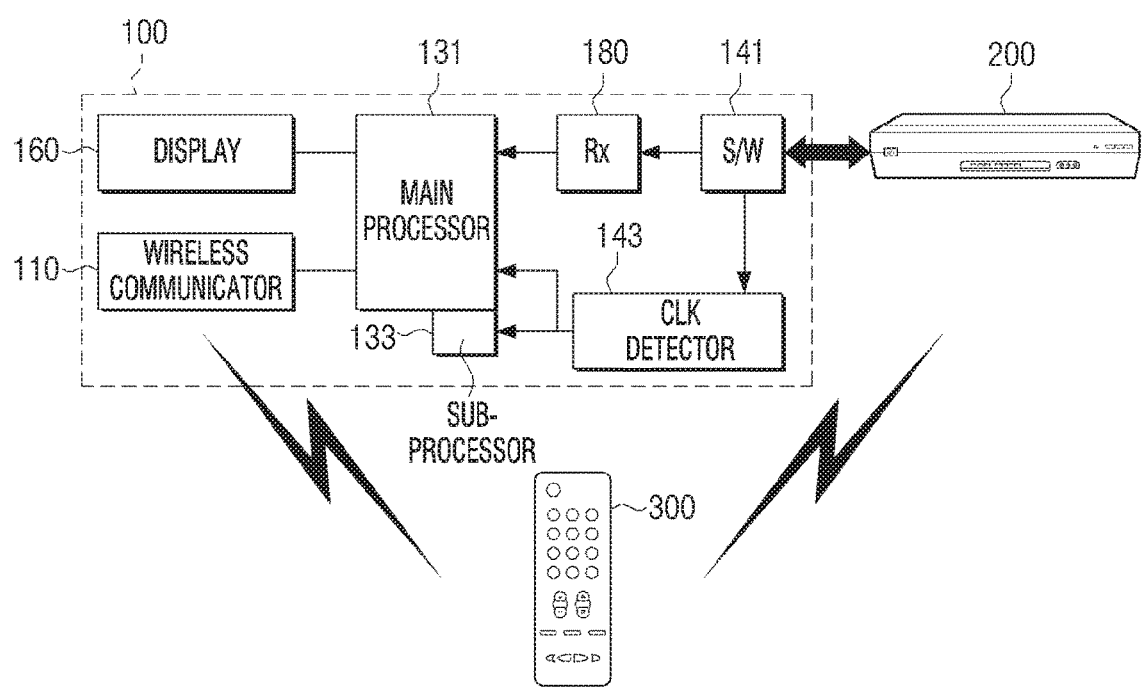
FIG. 4 is a diagram illustrating a power control operation of an electronic apparatus, according to an example embodiment.

According to an example embodiment in FIG. 4, it is illustrated that the switch 141 switches only a clock signal and transmit the clock signal to the clock detection unit 143, but example embodiments are not limited thereto. For example, the switch 141 may switch RGB data of an image signal, an H sync signal, a V sync signal, or the like. The detection circuit 140 may detect whether switched signals are present. As another example, the detection circuit 140 may directly detect at least one from among a clock signal, RGB data of an image signal, an H sync signal and a V sync signal using an image received through the wired communicator 120 without the switch 141.

According to an example embodiment in FIG. 4, the processor 130 may be configured with the main processor 131 and the sub processor 133. For example, the main processor 131 may be implemented as a CPU, and the sub processor 133 may be implemented as a MICOM. If the main processor 131 and the sub processor 133 are implemented as separate components, the main processor 131 and the sub processor 133 may be connected through a universal asynchronous receiver/transmitter (UART).

The sub processor 133 may determine the power state of the external input device 200 using at least one from among a clock signal, RGB data of an image signal, an H sync signal and a V sync signal, which are detected by the detection circuit 140. If the power state of the external input device 200 is the turned-off state, an image signal may not be transmitted via the wired communicator 120. Accordingly, the sub processor 133 may determine the power state of the external input device 200 based on whether a clock signal is present.

When the sub processor 133 monitors the power state of the external input device 200, the monitoring operation may continue regardless of the power state of the electronic apparatus 100. This is because the power supplied to the sub processor 133 may be maintained even if the electronic apparatus 100 enters the suspend state in response to a power-off signal.

The sub processor 133 may determine the power state of the external input device 200 in response to a power-off signal input from the remote controller 300, and may also determine the power state of the external input device 200 at regular time intervals, regardless of an input of a power-off signal.

When the power state of the electronic apparatus 100 and of the external input device 200 are the turned-on state, the electronic apparatus 100 may receive an image signal through the wired communicator 120 from the external input device 200. Then, the image signal transmitted passing through the image receiver (Rx) may be processed in the main processor 131 and be displayed on the display 160. In this case, the sub processor 133 may determine the power state of the external input device 200 at regular time intervals using a clock signal, etc., detected by the detection circuit 140.

When the signal for turning off the power of the electronic apparatus 100 is received from the remote controller 300, the electronic apparatus 100 may convert the power state to a suspend state. The signal for turning off power which is received from the remote controller 300 may be the signal for turning off only the electronic apparatus 100, or may be the signal for turning off both the electronic apparatus 100 and the external input device 200. For example, the electronic apparatus 100 may convert the power state thereof in response to the power-off signal and simultaneously transmit the power-off signal to the external input device 200 through the wired communicator 120 (e.g., an HDMI-CEC line).

After the power state is converted to the suspend state, the sub processor 133 may determine the power state of the external input device 200 based on whether a clock signal, RGB data of an image signal, an H sync signal, and a V sync signal are present. If the power state of the external input device 200 is still in the turned-on state, it may indicate that the operation of turning off power has not been performed for various reasons, such as a malfunction in transmission of a power-off signal, a malfunction in the external input device 200, no HDMI-CEC support, or the like.

If the power of the electronic apparatus 100 is turned off, the sub processor 133 may re-transmit a power-off control signal to the external input device 200 using the remote controller 300 to turn off the power of the connected external input device 200 as well.

The sub processor 133 may control the wireless communicator 110 directly or through the main processor 131. The sub processor 133 may control the wired communicator 110 to transmit a control signal for turning off the power of the connected external input device 200 to the remote controller 300. The sub processor 133 may repeat the operation of transmitting the control signal until the power state of the electronic apparatus 100 is consistent with the power state of the external input device 200.

Below, for understanding of the present disclosure, an example embodiment in which the electronic apparatus 100 is a TV and the external input device 200 is a set-top box will be described.

The remote controller 300 may perform the operation of turning off the power of a TV 100 in response to a user command. The TV 100 may determine whether the power of the set-top box 200 is turned on or turned off by detecting a clock signal. If it is determined that the power of the set-top box 200 is turned on, the TV 100 may transmit a control command for turning off the power of the set-top box 200 to the remote controller 300 via a Bluetooth back channel. The remote controller 300 which receives the control command may transmit a control command for turning off the power of the set-top box 200 to the set-top box 200 by an IR communication method.

According to example embodiments described above, the power state of the electronic apparatus 100 and the power state of the external input device 200 may be controlled to be consistent with each other. It may also be possible to detect non execution of a power-off command for a malfunction, and accordingly, the reliability of an integral power control may improve.

Figure 5:
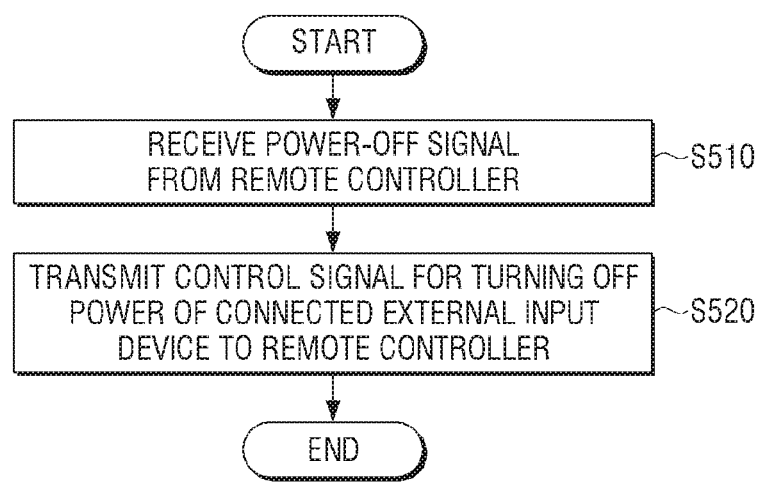
FIGS. 5, 6 and 7 are flowcharts illustrating a power controlling method of an electronic apparatus, according to one or more example embodiments.

FIG. 5 is a flowchart illustrating a power controlling method of an electronic apparatus 100 according to an example embodiment.

Referring to FIG. 5, the electronic apparatus 100 may receive a power-off signal from the remote controller 300 (S510). For example, the power-off signal may be a control code for turning off only the power of the electronic apparatus 100, or may be a control code for turning off both the power of the electronic apparatus 100 and of the external input device 200. The electronic apparatus 100 may convert the power state thereof from the turned-on state to the turned-off state (e.g., a suspend state).

The electronic apparatus 100 may transmit to the remote controller 300 the control signal for turning off the power of the external input device 200 that is connected with the electronic apparatus 100 via cable (S520). In other words, to synchronize the power state of the electronic apparatus 100 with the power state of the external input device 200, the electronic apparatus 100 may use the remote controller 300 as a bypass route through which the power-off control signal is transmitted.

As the electronic apparatus 100 uses the bidirectional communication such as Bluetooth in transmitting a control signal to the remote controller 300, the problem of directivity may not arise. Also, an IR communication signal should toggle (on/off) power, but a BT communication signal may include a signal commanding the conversion to a certain power state (e.g., a power-off state).

A power state determination process may be performed for the external input device 200 connected through a wired communication interface such as an HDMI. Without the power state determination process, the electronic apparatus 100 may control the remote controller 300 to transmit the power-off command to the external input device 200 one more time to turn off the power of the external input device 200 for sure. As the power-off command is transmitted to the external input device 200 by bidirectional communication such as Bluetooth communication as described above, it may be unlikely that the power state of the external input device 200 is converted to the turned-on state in response to the power-off command transmitted one more time.

Figure 6:
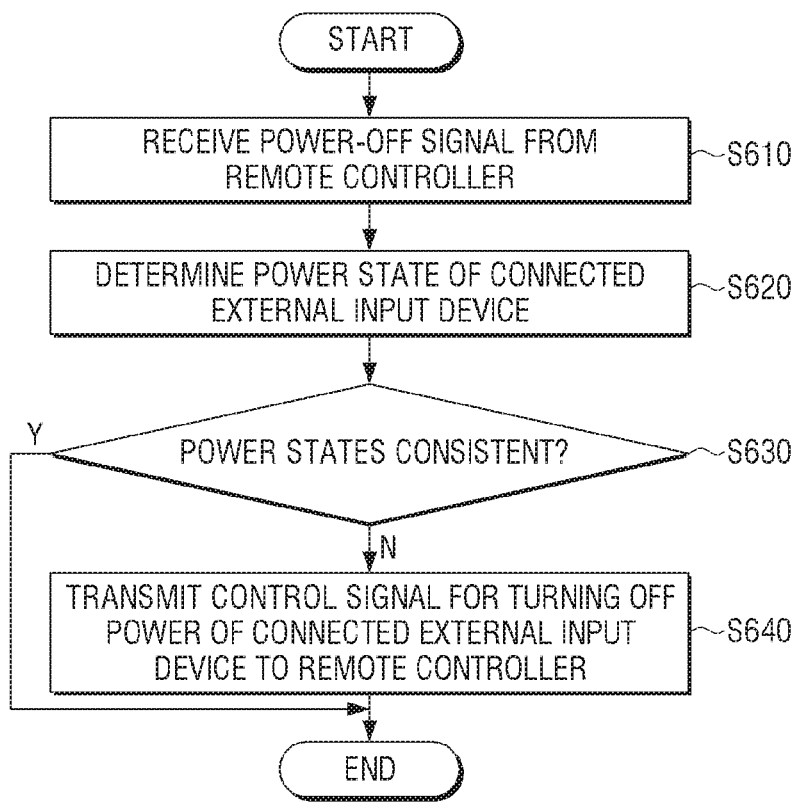
Figure 7:
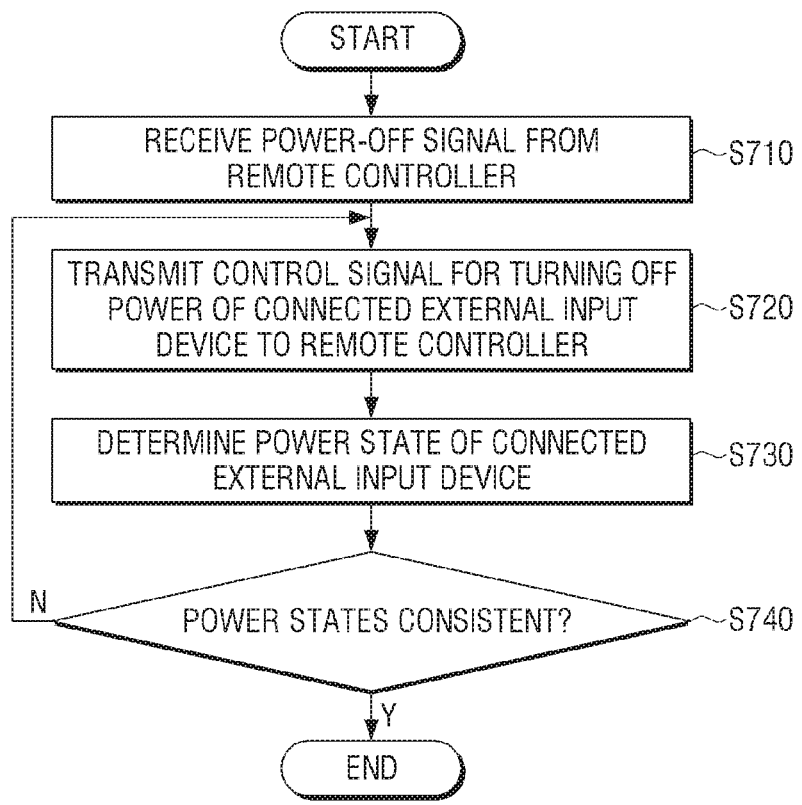

According to example embodiments illustrated in FIGS. 6 and 7, the electronic apparatus 100 may determine the power state of the external input device 200. A difference between an example embodiment of FIG. 6 and an example embodiment of FIG. 7 is the time point at which the power state of the external input device 200 is determined.

If the electronic apparatus 100 can control the power of the external input device 200 through the HDMI-CEC, it may be appropriate to apply an example embodiment of FIG. 6 to the prevention of a malfunction occurred in the HDMI-CEC transmission process and a malfunction of the external input device 200. Also, it may be appropriate to use an example embodiment of FIG. 7 in performing the integral power control for the external input device 200 which does not support the HDMI-CEC. However, example embodiments are not limited thereto.

FIG. 6 is a flowchart illustrating a power controlling method of the electronic apparatus 100 according to an example embodiment. Referring to FIG. 6, the electronic apparatus 100 may receive a power-off signal from the remote controller 300 (S610).

The electronic apparatus 100 may determine the power state of the external input device 200 in response to the received power-off signal (S620). For example, the electronic apparatus 100 may determine the power state of the external input device 200 based on whether an HDMI signal connected with external input device 200 is present. The electronic apparatus 100 may convert the power state thereof from a power-on state to a power-off state (e.g., a suspend state). The electronic apparatus 100 may also convert the power state thereof to the power-off state after the power state of the external input device 200 is determined.

If the power state of the electronic apparatus 100 is not consistent with the power state of the external input device 200 (S630-N), the electronic apparatus 100 may transmit a control signal for turning off the power of the connected external input device 200 to the remote controller 300 (S640). The electronic apparatus 100 may also transmit the information about the external input device 200 to the remote controller 300 with the control signal. For example, the information about the external input device 200 may be device information such as a model name of the external input device 200, control code set information, source information, and the like. The information on the external input device 200 may be used as the information for the remote controller 300 to recognize the external input device 200 for an integral remote controller function. The remote controller 300 which transmits the control signal may also transmit a power-off control signal to the external input device 200.

FIG. 7 is a flowchart illustrating a power controlling method of the electronic apparatus 100 according to an example embodiment. Referring to FIG. 7, the electronic apparatus 100 may receive a power-off signal from the remote controller 300 (S710). Then, the electronic apparatus 100 may transmit to the remote controller 300 a control signal for turning off the power of the external input device 200 that is connected with the electronic apparatus 100 via cable (for example, being connected via an HDMI interface) (S720).

After the control signal is transmitted to the remote controller 300, the electronic apparatus 100 may determine the power state of the external input device 200 (S730). For example, the electronic apparatus 100 may detect a clock signal among the HDMI signals received from the external input device 200. The electronic apparatus 100 may determine the power state of the external input device 200 according to whether the detected clock signal is present.

If the power of the external input device 200 is turned off in response to the transmitted control signal (S740-Y), it may indicate that the integral power control operation which the electronic apparatus 100 intended has been successfully performed.

However, if the power state of the external input device 200 is not consistent with the power state of the electronic apparatus 100 (S740-N), the electronic apparatus 100 may re-transmit the control signal until it is determined that the power state of the external input device 200 is consistent with the power state of the electronic apparatus 100 (S720, S730 and S740).

Figure 8:
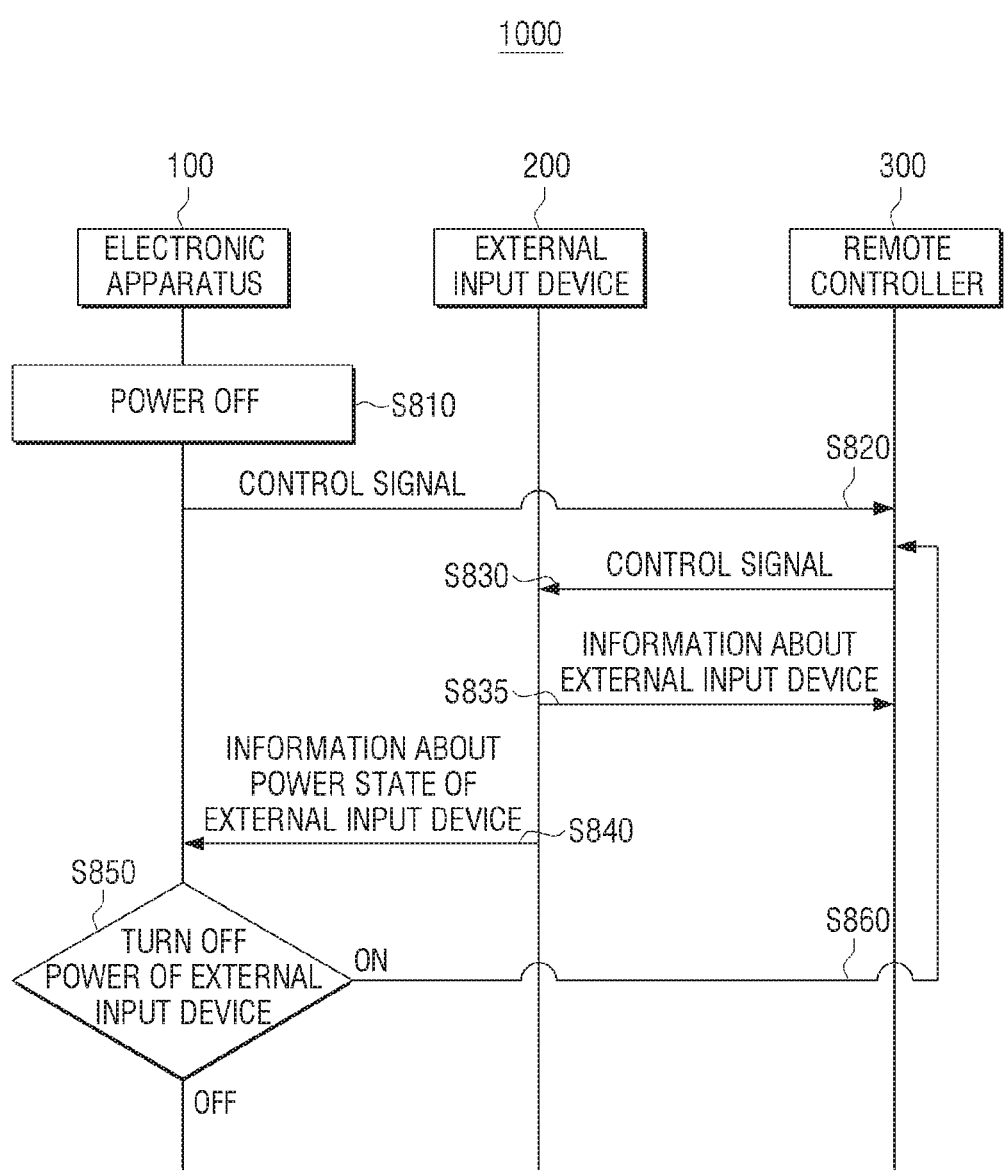
FIG. 8 is a sequence diagram illustrating an operation of a system, according to an example embodiment.

FIG. 8 is a sequence diagram illustrating an operation of a system 1000 according to an example embodiment.

Referring to FIG. 8, the electronic apparatus 100 may convert the power state from a power-on state to a power-off state (S810). For example, the electronic apparatus 100 may convert the power state from a power-on state to a power-off state in response to a power-off signal received from the remote controller 300. Even if the power state is converted to the power-off state, the electronic apparatus 100 may not stop the power supplied to some of the components (e.g., the sub processor, the detection circuit, etc.) and allow the operation of converting the power state to the power-on state, the operation of determining the power state of the external input device 200, etc., to be performed.

The electronic apparatus 100 may transmit a control signal for turning off the power of the external input device 200 to the remote controller 300 (S820). The remote controller 300 may transmit a control signal which corresponds to the power-off command to the external input device 200 (S830). The remote controller 300 may receive the information about the external input device 200 from the electronic apparatus 100 and determine a control code set for controlling the external input device 200 (S835).

The electronic apparatus 100 may obtain the power state information from the external input device 200 (S840). For example, the electronic apparatus 100 may recognize whether an image signal is continuously input in the external input device 200 by detecting a wired interface signal. The wired interface signal that the electronic apparatus 100 uses may be a clock signal, RGB of an image signal, an H sync, a V sync, or the like.

If it is determined that the external input device 200 maintains the power-on state based on the detected signals (S850-ON), the electronic apparatus 100 may transmit to the remote controller 300 a control signal for controlling the remote controller 300 to re-transmit a power-off signal to the external input device 200 (S860).

Through the process described above, by simply pressing a power-off button on the remote controller 300, a user may turn off the power of the electronic apparatus 100 and of the external input device 200 for sure by the integral control of the power of the electronic apparatus 100 and the power of the external input device 200. Therefore, according to the various example embodiments, the reliability of the integral power control of the electronic apparatus and device which are connected with each other via cable may improve by using the integral remote controller function.

The methods according to one or more example embodiments may be implemented as a program command type that may be performed through various computer units and may be recorded in a computer readable medium. The computer-readable medium may include a program command, a data file, a data structure or the like, alone or a combination thereof. The program commands recorded in the computer-readable medium may be designed for the example embodiments or be known to those skilled in a field of computer software. Examples of the computer-readable media include magnetic media such as hard disks, floppy disks, and magnetic tape; optical media such as CD-ROMs and DVDs; magnetic media such as floppy disks; Magneto-optical media, and hardware devices specifically configured to store and execute program instructions such as ROM, RAM, flash memory, and the like. An example of the program instruction may include a machine code formed by a compiler, as well as a high-level language code which can be executed by a computer using an interpreter. The hardware device may be configured to operate as one or more software modules. Conversely, software modules may be configured to operate as a hardware device.

The foregoing example embodiments and advantages are merely examples and are not to be construed as limiting the example embodiments. The description of the example embodiments is intended to be illustrative, and not to limit the scope of the inventive concept, as defined by the appended claims, and many alternatives, modifications, and variations will be apparent to those skilled in the art.

What is claimed is:

1. An electronic apparatus comprising:
   a wireless communicator configured to communicate with a remote controller;
   a wired communicator connected to an external input device; and
   a processor configured to:
      in response to receiving a signal for turning off power of the electronic apparatus from the remote controller:
         change a power state of the electronic apparatus and a main processor of the processor;
         determine by a sub-processor of the processor, a power state of the external input device; and
         control the wireless communicator to transmit a control signal for turning off power of the connected external input device to the remote controller in response to the determined power state of the external input device being inconsistent with the power state of the electronic apparatus,
   wherein the remote controller transmits a signal for turning off the external input device in response to the control signal.

2. The electronic apparatus of claim 1, wherein the processor is further configured to, after transmitting the control signal to the remote controller, control the wireless communicator to re-transmit the control signal until the determined power state of the external input device is consistent with the power state of the electronic apparatus.

3. The electronic apparatus of claim 1, further comprising:
a detection circuit configured to detect a clock signal of a signal input through the wired communicator connected with the external input device,
wherein the processor is further configured to determine the power state of the external input device using the clock signal detected in the detection circuit.

4. The electronic apparatus of claim 3, wherein the wired communicator is an HDMI interface, and
wherein the clock signal is a clock signal of an HDMI signal.

5. The electronic apparatus of claim 1, wherein the processor is further configured to control the wireless communicator to transmit information about the connected external input device to the remote controller with the control signal.

6. The electronic apparatus of claim 5, wherein the information about the external input device comprises at least one from among device information of the external input device and source information input from the external input device.

7. The electronic apparatus of claim 1, wherein the wireless communicator is further configured to provide a unidirectional communication method when receiving a signal from the remote controller, and provide a bidirectional communication method when transmitting a signal to the remote controller.

8. The electronic apparatus of claim 7, wherein the unidirectional communication method is an infrared (IR) method, and the bidirectional communication method is one from among Bluetooth and Bluetooth Low Energy.

9. A power controlling method of an electronic apparatus, the method comprising:
receiving a signal from a remote controller for turning off power of the electronic apparatus; and
in response to receiving the signal for turning off the power of the electronic apparatus from the remote controller:
changing a power state of the electronic apparatus including a main processor;
determining by a sub-processor, a power state of the external input device; and
transmitting a control signal to the remote controller for turning off power of the external input device connected with the electronic apparatus to the remote controller in response to the determined power state of the external input device being inconsistent with the power state of the electronic apparatus; and
turning off power of the external input device in response to the control signal.

10. The power controlling method of claim 9, further comprising:
re-transmitting the control signal until the determined power state of the external input device is consistent with the power state of the electronic apparatus.

11. The power controlling method of claim 9, further comprising:
detecting a clock signal of a signal input from the external input device,
wherein the determining the power state of the external input device comprises determining the power state of the external input device using the detected clock signal.

12. The power controlling method of claim 11, wherein the external input device is connected with the electronic apparatus through an HDMI interface, and
wherein the clock signal that is input from the external input device is a clock signal of an HDMI signal.

13. The power controlling method of claim 9, further comprising:
transmitting information about the connected external input device to the remote controller with the control signal.

14. The power controlling method of claim 13, wherein the information about the external input device comprises at least one from among device information of the external input device and source information input from the external input device.

15. The power controlling method of claim 9, wherein the electronic apparatus provides a unidirectional communication method when receiving a signal from the remote controller, and provides a bidirectional communication method when transmitting a signal to the remote controller.

16. The power controlling method of claim 15, wherein the unidirectional communication method is an infrared (IR) method, and the bidirectional communication method is one from among Bluetooth and Bluetooth Low Energy.

17. An electronic apparatus comprising:
a processor comprising a main processor and a sub-processor, the processor configured to:
in response to receiving a signal for turning off power of the electronic apparatus from a remote controller:
change a power state of the electronic apparatus and the main processor of the processor;
determine by the sub-processor, a power state of an external input device; and
control a wireless communicator to transmit to the remote controller, a control signal for turning off power of the external input device connected to the electronic apparatus in response to the determined power state of the external input device being inconsistent with the power state of the electronic apparatus;
wherein the remote controller transmits a signal for turning off the external input device in response to the control signal; and
after transmitting the control signal to the remote controller, control the wireless communicator to re-transmit the control signal until the determined power state of the external input device is consistent with the power state of the electronic apparatus.

18. The electronic apparatus of claim 17,
wherein the main processor is configured to enter a suspend mode in which power is not supplied to the main processor in response to the electronic apparatus receiving the signal from the remote controller for turning off the electronic apparatus,
wherein the sub-processor is configured to maintain power supplied to the sub-processor in response to the electronic apparatus receiving the signal from the remote control for turning off the electronic apparatus, and
wherein the sub-processor is further configured to transmit the control signal to the remote controller for turning off the power of the connected external input device.

\* \* \* \* \*